US010539256B2

(12) United States Patent
Serum et al.

(10) Patent No.: US 10,539,256 B2
(45) Date of Patent: Jan. 21, 2020

(54) CONDUIT ADAPTERS

(71) Applicants: Jackson Serum, Mondovi, WI (US); Dustin Hoffman, Osseo, WI (US)

(72) Inventors: Jackson Serum, Mondovi, WI (US); Dustin Hoffman, Osseo, WI (US)

(73) Assignee: Connectum USA, LLC, Osseo, WI (US)

( * ) Notice: Subject to any disclaimer, the term of this patent is extended or adjusted under 35 U.S.C. 154(b) by 0 days.

(21) Appl. No.: 15/368,163

(22) Filed: Dec. 2, 2016

(65) Prior Publication Data
US 2018/0156372 A1 Jun. 7, 2018

(51) Int. Cl.
*F16L 15/00* (2006.01)
*F16L 33/34* (2006.01)

(52) U.S. Cl.
CPC .............. *F16L 15/006* (2013.01); *F16L 33/34* (2013.01)

(58) Field of Classification Search
CPC .................................. F16L 33/006; F16L 33/34
USPC .................................. 285/242, 259, 399, 390
See application file for complete search history.

(56) References Cited

U.S. PATENT DOCUMENTS

| | | | | |
|---|---|---|---|---|
| 1,236,145 A * | 8/1917 | Burns | ................... | F16L 13/122 403/360 |
| 2,315,792 A * | 4/1943 | Hoss | ....................... | F16L 37/02 285/383 |
| 2,321,260 A * | 6/1943 | Stecher | ................. | F16L 33/006 285/249 |
| 2,933,428 A * | 4/1960 | Mueller | ............. | B29C 65/0672 156/294 |
| 3,055,683 A | 9/1962 | Appleton | | |
| 3,136,570 A * | 6/1964 | Lee | ......................... | E03C 1/042 137/360 |
| 3,392,746 A * | 7/1968 | Young | ..................... | E03C 1/042 137/360 |
| 3,434,744 A * | 3/1969 | Paterson | ................. | F16L 19/12 285/340 |
| 3,482,859 A * | 12/1969 | Bowlin | ................. | F16L 21/035 285/351 |
| 3,525,542 A * | 8/1970 | Belart | .................... | F16L 33/207 285/256 |

(Continued)

OTHER PUBLICATIONS

Lamson & Sessions, Carlon Expansion Fittings for PVC Rigid Nonmetallic Conduit, instruction manual, copyright date of 2004, pp. 1-6, http://www.homedepot.com/catalog/pdfImages, USA.

(Continued)

*Primary Examiner* — David Bochna
(74) *Attorney, Agent, or Firm* — Anthony J. Bourget

(57) ABSTRACT

An adapter for connecting conduit to a threaded component such as for connecting a PVC conduit to a threaded pipe includes a tube having a threaded end and a conduit-receiving female end to receive the conduit, the female end having a length of at least 70% of the total length of the adapter. The female end includes an elongated chamber having a length of at least two inches and at least as long as an outer diameter of the adapter. In other aspects the adapter includes an inner transition portion having a tapered inner surface, and in further aspects the adapter includes a grip region having recesses and such that an installer grasping the adapter can grip the adapter with a thumb and multiple fingers while pressing the adapter into a palm of the hand.

5 Claims, 15 Drawing Sheets

(56) References Cited

U.S. PATENT DOCUMENTS

| | | | | |
|---|---|---|---|---|
| 3,531,143 | A * | 9/1970 | Antal | F16L 33/01 138/109 |
| 3,610,288 | A * | 10/1971 | Carr | B65D 59/00 403/305 |
| 3,783,178 | A | 1/1974 | Philibert et al. | |
| 3,784,239 | A * | 1/1974 | Carter | B29C 33/52 285/294.2 |
| 3,900,220 | A * | 8/1975 | Buchser | F16L 47/16 285/392 |
| 4,093,280 | A * | 6/1978 | Yoshizawa | F16L 15/001 285/390 |
| 4,154,466 | A * | 5/1979 | Simmons | F16L 47/16 285/390 |
| 4,537,426 | A * | 8/1985 | Carter, Sr. | F16L 47/16 285/110 |
| 4,687,232 | A * | 8/1987 | Zimmerman | F16L 27/12 285/302 |
| 4,861,942 | A * | 8/1989 | Moran, Jr. | H02G 3/26 174/38 |
| 5,333,650 | A * | 8/1994 | Folkman | F16L 33/34 138/103 |
| 5,915,736 | A * | 6/1999 | Marik | F16L 41/08 138/121 |
| 6,464,265 | B1 * | 10/2002 | Mikol | E03C 1/06 285/390 |
| 6,692,035 | B2 * | 2/2004 | Baruh | F16L 21/002 285/148.18 |
| 6,976,710 | B1 * | 12/2005 | Bedford | F16L 55/1608 138/97 |
| 7,234,732 | B2 * | 6/2007 | Ball | F16L 25/14 285/148.19 |
| 7,550,669 | B2 * | 6/2009 | Rizzuto, Jr. | F16L 25/10 138/120 |
| 7,566,076 | B2 * | 7/2009 | Bryan | F16L 55/1608 285/15 |
| 8,020,899 | B2 * | 9/2011 | Hanna | F16L 47/16 285/333 |
| 8,474,490 | B1 * | 7/2013 | Ibarra | F16L 58/181 138/109 |
| 8,757,672 | B2 * | 6/2014 | Malagnino | F16L 47/02 285/399 |

OTHER PUBLICATIONS

Gross Automation, Expansion Couplings, Drawing, date created listed as Apr. 28, 2003, pp. 1-2, http://www.carlonsales.com/productdrawings.pdf, USA.

Carlon Sales, Master Catalog, catalog pages, undated, cover page, Table of Contents and p. 175, http://www.carlonsales.com/techinfo/brochures/mastercatalog/Master%20Catalog_low_res.pdf, USA.

Cantex, Inc., Female Adapters Schedule 40 & 80 Fittings, Sep. 25, 2007; http://www.cantexinc.com/Products/NM_Fittings_Accessories/Female_Adapter.php, USA.

Cantex, Inc., Terminal Adapters 1/2" Thru 1-1/2" Schedule 40 & 80 Fittings, Sep. 12, 2007, http://www.cantexinc.com/Products/NM_Fittings_Accessories/Male_Adapter.php, USA.

Cantex, Inc., Schedule 40 Rigid PVC Conduit, Jul. 13, 2010, http://www.cantexinc.com/Products/Schedule_40/Conduit/, USA.

Charlotte Pipe and Foundry Company, Pressure, Dimensional Catalog, Jul. 20, 2016, pp. 1, 2 and 13-14, http://www.charlottepipe.com/Documents/DimensionalCatalogs/Pressure_Pipe_Fittings.pdf, USA.

UL, UL 651 Standard for Safety, Schedule 40, 80, Type EB and A Rigid PVC Conduit and Fittings, Eighth Edition, Oct. 25, 2011, cover page, p. tr1, reprinted title page, pp. 19, 21-23. Portions reprinted with permission of UL, USA.

* cited by examiner

CONDUIT ADAPTERS

BACKGROUND OF THE INVENTION

1. Field of the Invention

The present invention relates to adapters for connecting conduits to boxes, fittings, pipes and systems, and more particularly to adapters for adapting nonmetallic conduits to boxes, threaded fittings, threaded pipes and metallic systems.

2. Background Information

Adapters exist for adapting nonmetallic conduits to boxes, threaded fittings and metallic systems. Some adapters have threads on one end and a socket on the other end. Typically a threaded end of a plastic adapter is threaded upon a pipe while a socket or bell end of the adapter receives an end of a conduit. The pipe may have internal or external threads, and the adapter will have corresponding threads to match. The adapter allows the conduit to be securely connected to the pipe. Such adapters are commonly used by electricians who run plastic conduit underground and then connect the conduit to a pipe or electrical box, such as connecting to a metal pipe or metal electrical box, for instance. The conduit is typically glued into the socket or bell end of the adapter.

FIGS. 20-26 show prior art conduit 90 and prior art adapters 92, 94. There are generally two major providers of such adapters in the United States, including providers such Cantex Inc., of Fort Worth, Tex. and the provider of Carlon® products, owned by ABB Asea Brown Boveri Ltd, of Switzerland. Conduit 90 is a hollow tube typically made of plastic or PVC or other material and may come in a variety of lengths and gauges or sizes. In some cases a conduit 90 will span several feet in length, such as 8 feet or 10 feet or 20 feet or even longer. Conduit 90 typically comes in a variety of sizes or "trade sizes" including standard trade sizes such as ½, ¾, 1, 1¼, 1½, 2, 2½, 3, 3½, 4, 5 and 6. Such standard trade sizes will meet industry standards or specifications, such as in one instance where the trade sizes correspond to UL-651 standards and/or NEMA TC-2 standards. Typically one end of conduit 90 has an outer diameter configured to fit comfortably within a "bell" end 91 of the conduit 90 having a slightly larger inner diameter to receive the end of an adjacent like conduit 90. The female end is configured to receive a same or standard trade size conduit while the threaded end is configured to connect to a threaded component of the same or similar standard size component. In some instances a conduit 90 in compliance with standards will exhibit an outer diameter 96 configured to insert into a bell 91 of a like conduit 90 having a bell inner diameter 97 (see FIG. 26). Such standard trade sizes, (at least according to published data for Cantex Schedule 40 Conduit in compliance with UL 651) of conduit 90 in some instances will have the following characteristics (size: outer diameter): size ½: 0.840; size ¾: 1.050; size 1: 0.1315; size 1¼: 1.660; size 1½: 1.900; size 2: 2.375; size 2½: 2.875; size 3: 3.50; size 3½: 4.000; size 5: 5.563; size 6: 6.625. Further, internally-threaded adapters configured to comply with standards are typically fittings intended for joining a length of rigid PVC conduit, a PVC elbow to threaded rigid metal conduit or other externally-threaded devices. Externally-threaded adapters (also referred to as terminal adapters) configured to comply with standards are typically fittings intended for joining a length of rigid PVC conduit or elbow to a) the knockout area of a metal box with a metal locknut, b) a threaded metal hub or fitting on a metal box, c) a threaded hub on a phenolic box, or d) a knockout in a phenolic box.

Several lengths of conduit 90 may be connected together end-to-end to span a desired distance. A length of conduit 90 is often buried in ground so that cables or electrical wires may pass through conduit 90 for protection. In some instances conduit 90 will terminate adjacent a conduit box or pipe 93 or other structure for connection. For instance, a conduit 90 may terminate adjacent a threaded pipe 93 where the conduit needs to be connected to the pipe. Because conduit 90 lacks a threaded end, an adapter 92, 94 is used to connect the conduit 90 to the pipe 93 for instance. A terminal adapter such as prior art male adapter 92 is threaded onto a threaded pipe 93, for instance, and then the bell end 95 of the adapter 92 receives a terminal end of conduit 90. The conduit 90 is glued into the bell end of the adapter 92. In this manner the conduit 90 is secured to the threaded pipe 93. Where the threaded pipe 93 includes internal threads, a male adapter 92 is used; where the threaded pipe 93 includes external threads, a female adapter 94 is used.

There are other types of adapters or connectors for which patents have been granted, such as those shown in U.S. Pat. Nos. 3,783,178 and 3,055,683. While the foregoing adapters or connectors have useful features and some have been the subject of patents, there is room for improvement.

SUMMARY OF THE INVENTION

An adapter is configured to connect conduit to a threaded component such as connecting PVC conduit to a threaded pipe where the adapter includes a threaded end having threads to mesh with a pipe or other threaded component, and a conduit-receiving female end to receive a conduit, the female end having an elongated inner chamber to secure the inserted conduit. The elongated inner chamber has a length which is significantly elongated as compared to prior adapters that have been in use for decades. In one aspect the female end has a length of at least 2 inches measured from a terminal edge of the female end to the treaded end with a terminal portion of the female end having an outer diameter and the adapter having a total length at east as long as the outer diameter.

In further aspects an adapter having a threaded end configured to connect to a threaded component and a female end configured to receive a conduit includes a transition portion spanning from threads of the threaded end to a stop within the female end, the stop preventing further insertion of a same diameter conduit within the adapter, the transition portion having a tapered inner surface.

In a further aspect the invention includes an adapter having a threaded end having a total thread length, a female conduit receiving end, and a grip region positioned at the female conduit receiving end where the grip region spans from the threaded end toward a terminal end of the receiving end, the grip region having a length of at least half the total thread length. In further aspects the grip region includes at least one rib extending outward no greater than an outermost diameter of the female receiving end. Additional aspects are presented herein.

The above partial summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

Figure 1:
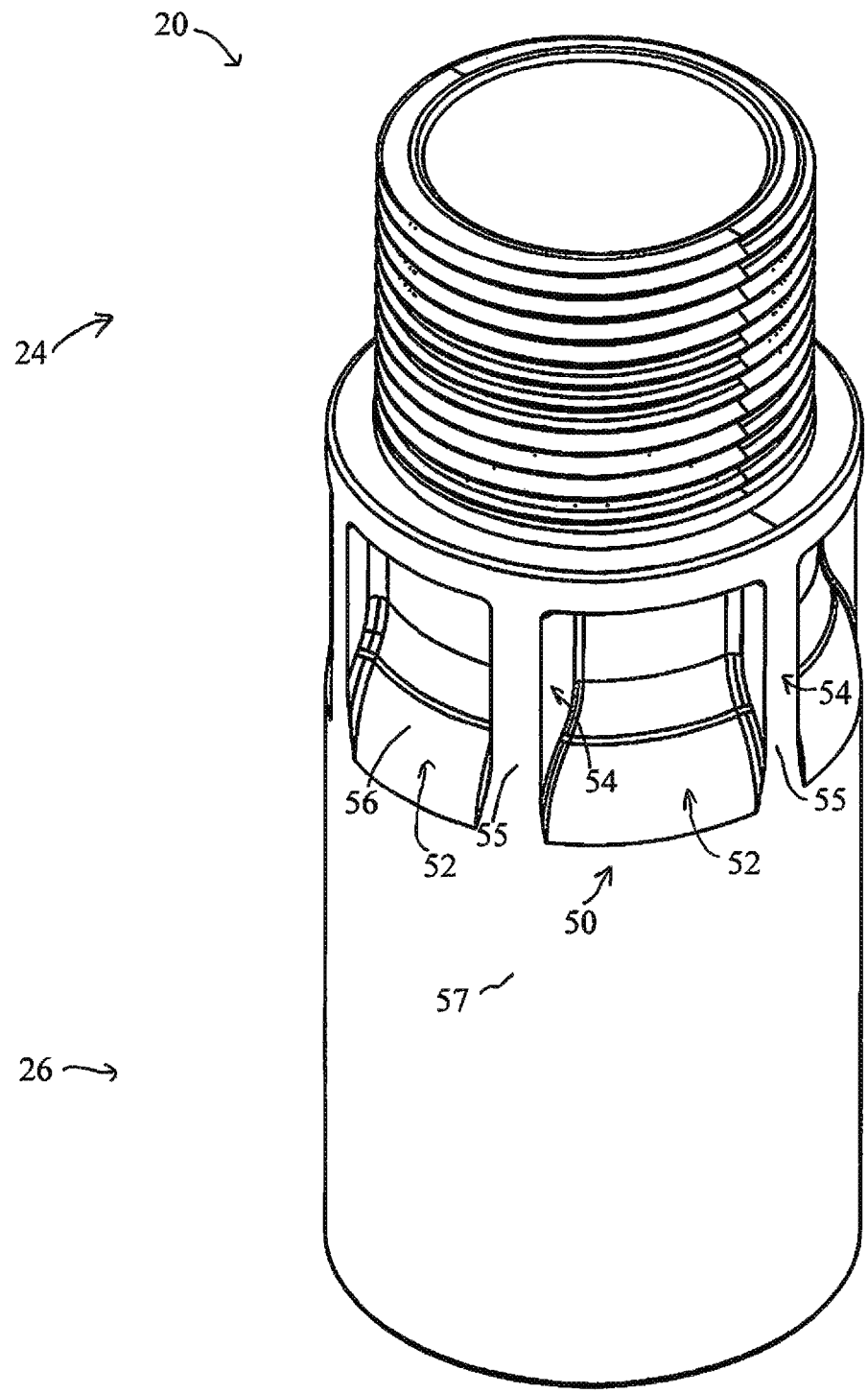
FIG. 1 is a perspective view of an adapter in accordance with one aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-19, aspects of the adapter are shown. Adapter 20 comprises a tube 22 having a threaded end 24 and an opposite conduit-receiving female end 26. Adapter 20 is configured to receive a conduit 90 at one end, such as at female end 26, and to connect to conduit boxes, threaded pipes, threaded fittings or other threaded components at the opposite threaded end 24. Adapter 20 is threaded upon a threaded pipe, for instance, or within a conduit box, by use of threaded end 24. The female end 26 is supplied with a glue or cement and conduit 90 inserted into end 26 for desired connection. A glue or cement or solvent is placed within female end 26 prior to insertion of conduit 90. End 24 and end 26 are both configured to fit a same diameter conduit. For instance, where end 24 is configured to fit a ¾ size conduit, end 26 is also configured to fit the same ¾ size conduit. Adapter 20 may come in a variety of sizes which match the variety of sizes of conduit 90. For instance, adapter 20 may come in sizes such as ½, ¾, 1, 1¼, 1½, 2, 2½, 3, 3½, 4, 5 and 6. Thus a different adapter 20 is configured to fit each of the different variety of sizes of conduit 90. The same adapter 20, and its various trade sizes, is configured to fit both Cantex® and Carlon® types of conduit 90 or corresponding various trade sizes of conduit 90. The same conduit 20 may also fit other manufacturer's varieties of conduit.

Figure 2:
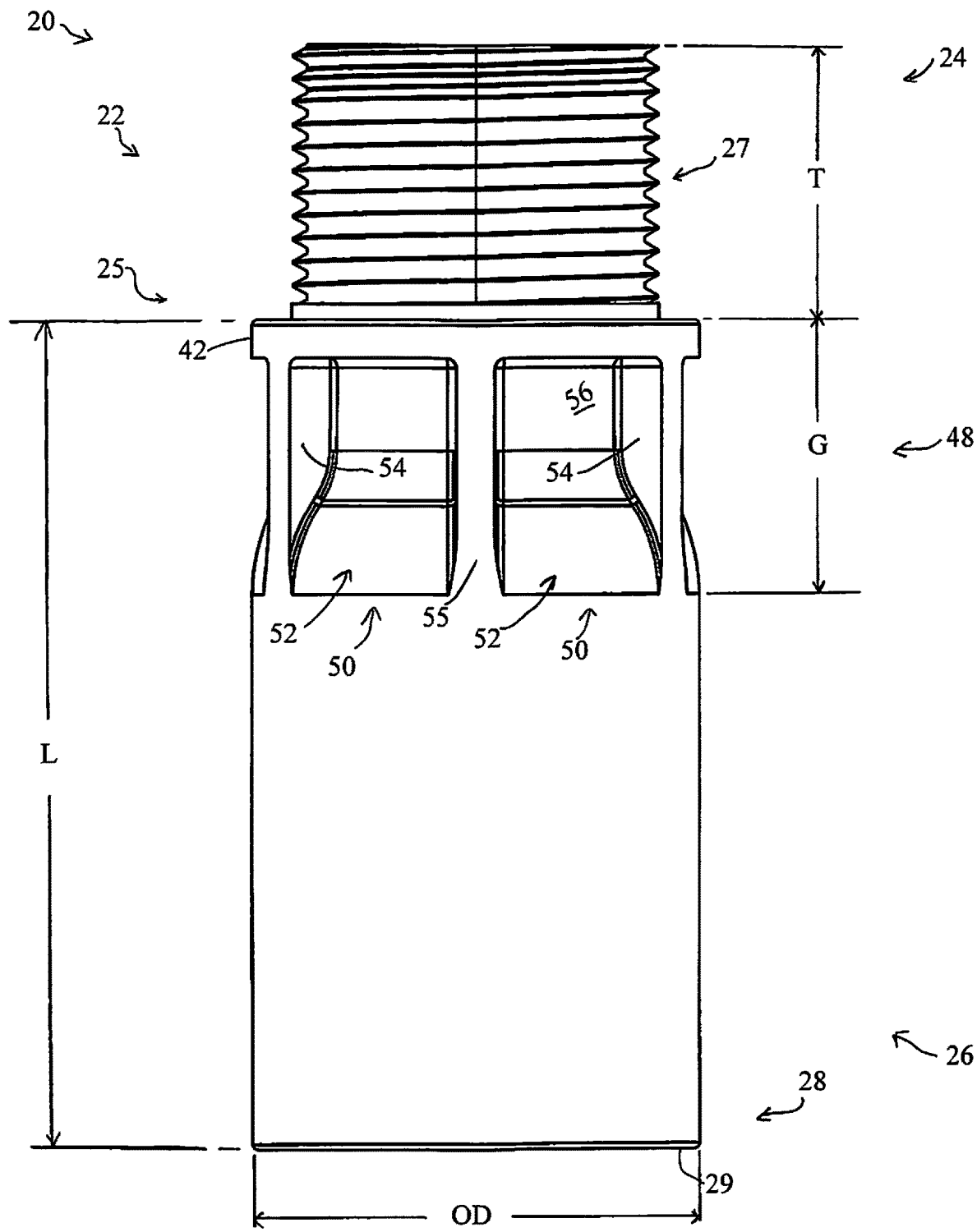
FIG. 2 is a side view of the adapter of FIG. 1.
Figure 3:
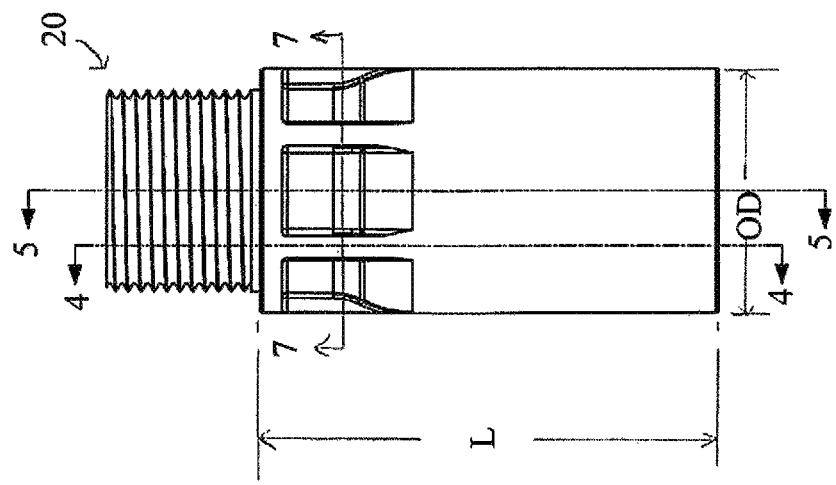
FIG. 3 is a front view of the adapter of FIG. 1.
Figure 7:
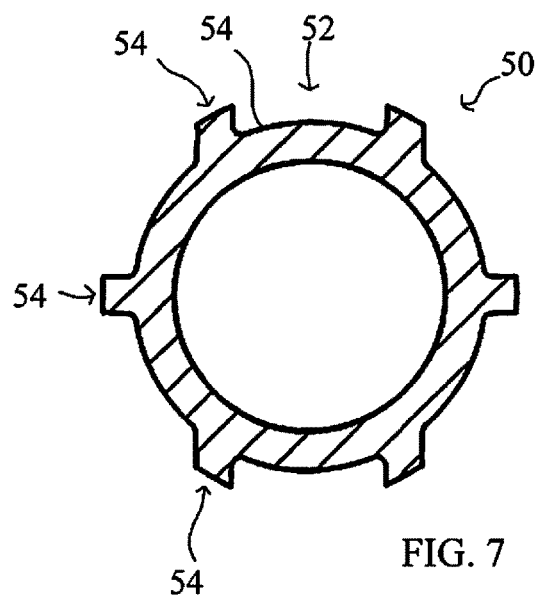
FIG. 7 is a section view taken along line 7-7 of FIG. 3.
Figure 8:
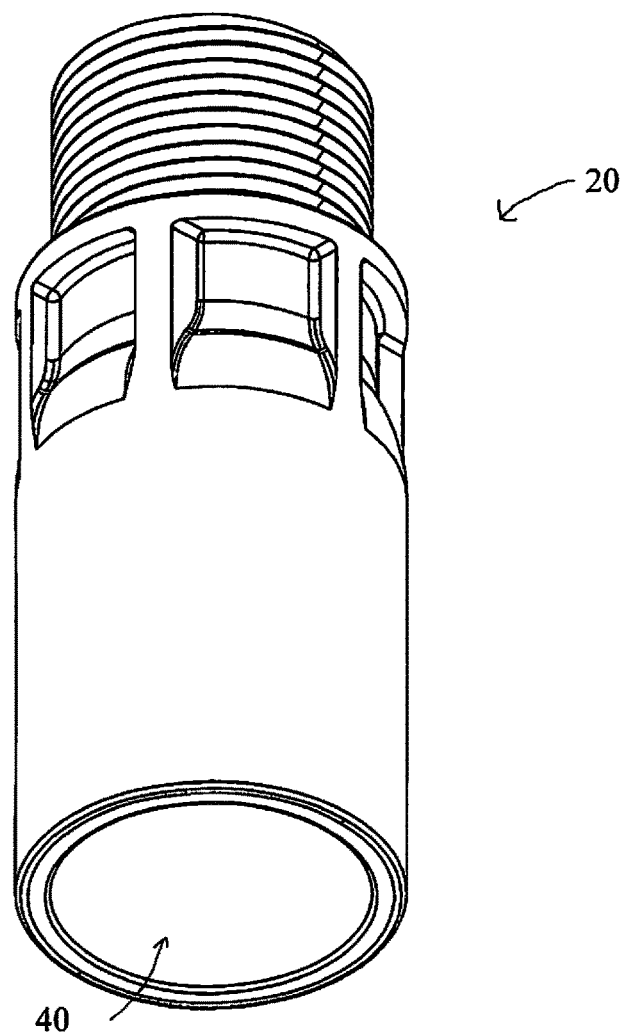
FIG. 8 is a bottom perspective view of the adapter of FIG. 1.
Figure 9:
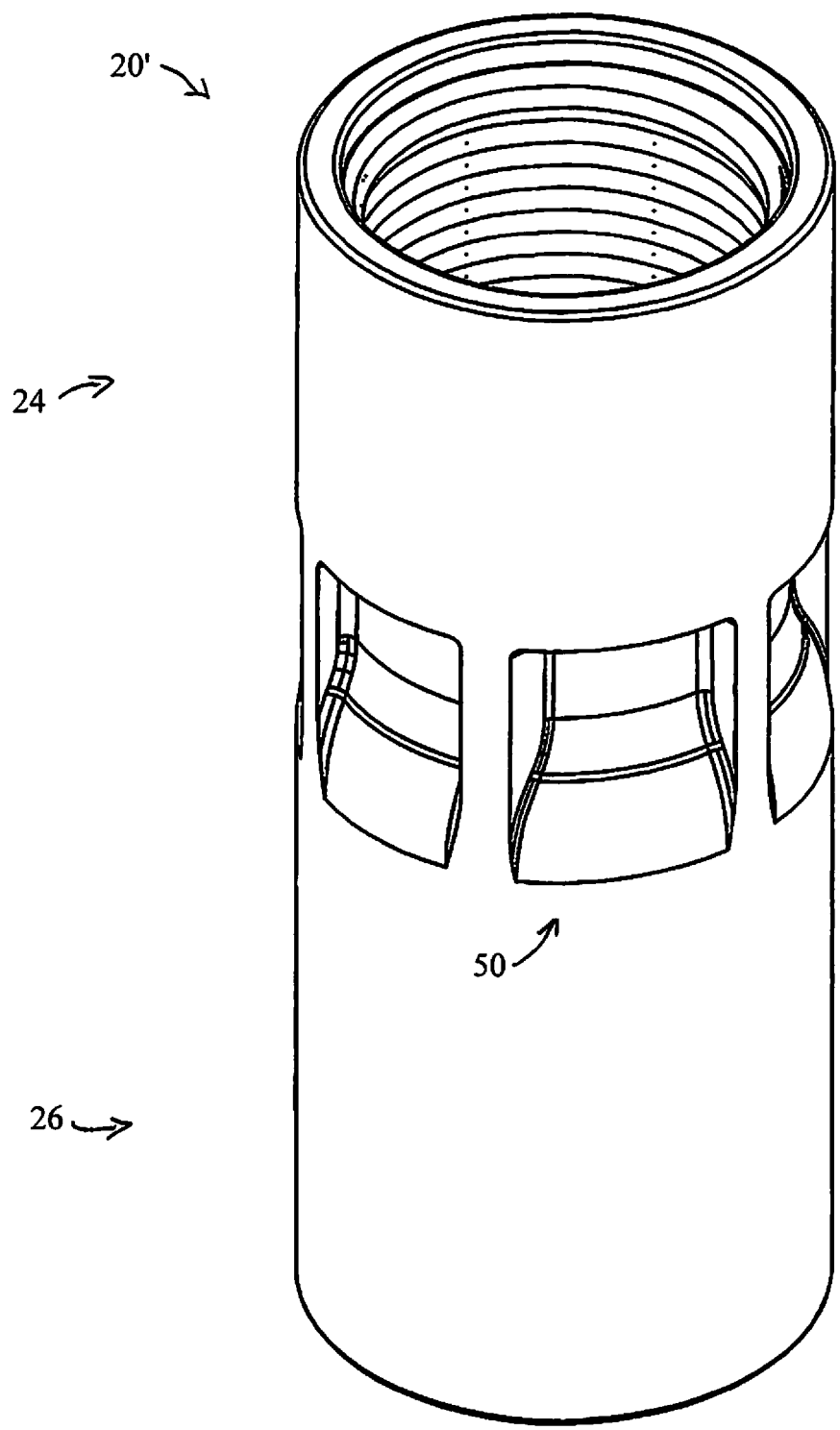
FIG. 9 is a top perspective view of an adapter in accordance with a further aspect of the invention.
Figure 10:
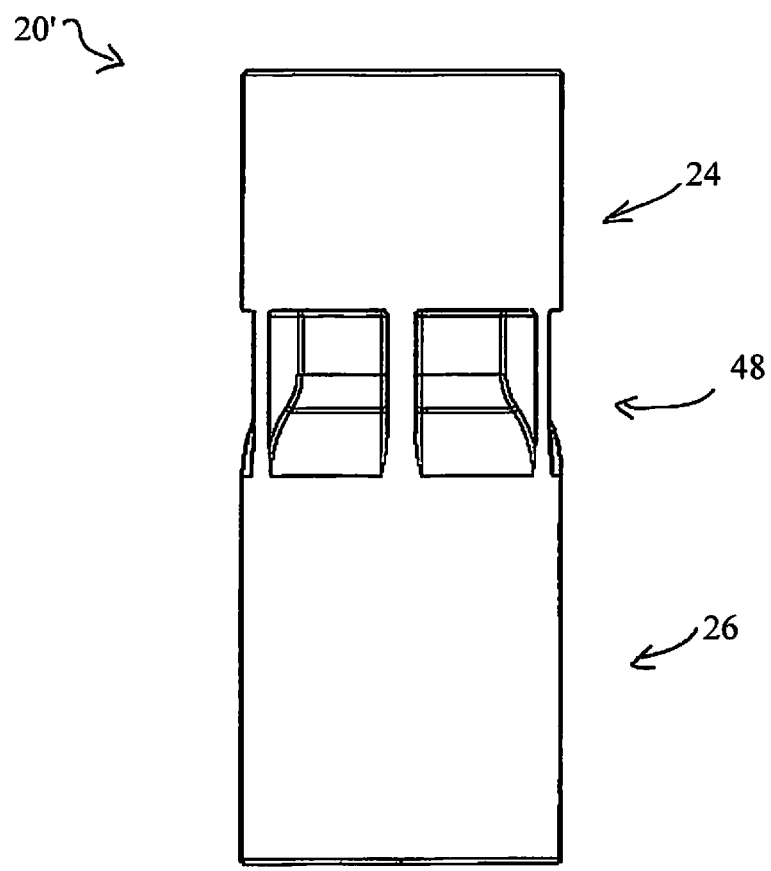
FIG. 10 is a side view of the adapter of FIG. 9.

In one aspect of the invention and with reference to FIG. 1, FIG. 2 and FIG. 3, female end 26 has a length "L" as measured from a terminal edge 29 of female end 26 to a beginning 25 of the threaded end 24. In one aspect female end 26 has a length "L" of at least 2 inches and with a terminal portion 28 of adapter 20 having an outer diameter OD where a total length TL of adapter 20 is at least as long as the outer diameter OD. In many aspects the total length of adapter 20 will be much greater than the OD. For instance, in some examples the total length TL of adapter 20 will be at least one inch longer than the OD of adapter 20, and in some instances at least two inches or nearly two inches longer than the OD of adapter 20. The Total Length is the sum of the length L+Thread Length T as shown in FIG. 2 and/or as referenced in FIG. 18 and FIG. 19 as TL. Having such relatively long or deep female end 26 and long total length TL in relation to the diameter of adapter 20 provides, as further referenced herein, a strong connecting joint and reduces or eliminates the occurrence of separation of adapter 20 from conduit 90 during installation and also lessens or eliminates occurrences of leakage within the connection. Such configuration of an adapter 20 having a long length for a receiving female end 26 relative to the outer diameter of female end 26, or such large volume cavity 40 relative to the overall adapter 20, has heretofore been unrecognized as workable or useful in an adapter application. In other aspects length L is at least 1.2 times the measure of OD, and in further aspects the length L has a longer measure, such as a measure of at least 1.25 times OD, and in yet further aspects has a measure greater than 1.5 times OD. Having a measure L which is at least 1.2 times the measure of OD also allows for a greater surface area or cavity 40 within female end 26 for securing an inserted conduit 90.

In one example, an adapter 20 configured for trade size 1 will have a female end 26 configured to receive an end of a trade size 1 conduit 90 while a threaded end 24 is configured (with internal or external threads) to fit a threaded end of a trade size 1 pipe or other threaded component. The female end 26 of at least 2 inches provides a surface area for strong connection and eliminates or nearly eliminates a tendency for conduit 90 to slip out from female end 26. Having female end 26 of at least 2 inches and where the total length of adapter has a length at least as great as the outer diameter of the adapter provides an enhanced cavity connection such that separation of conduit 90 from adapter 20 will be eliminated or lessened if and when adjustment or movement of conduit 90 occurs during installation. In other aspect the length "L" of female end 26 will be longer than 2 inches while the total length of adapter 20 also remains at least as long or longer compared to the OD. Providing a longer length "L" while also maintaining the ratio of the total length of adapter 20 to be at least as long as the OD allows a worker to have peace-of-mind and relative certainty that the structural connection between adapter 20 and conduit 90 will be sufficient and not become disconnected as addressed below.

Figure 20:
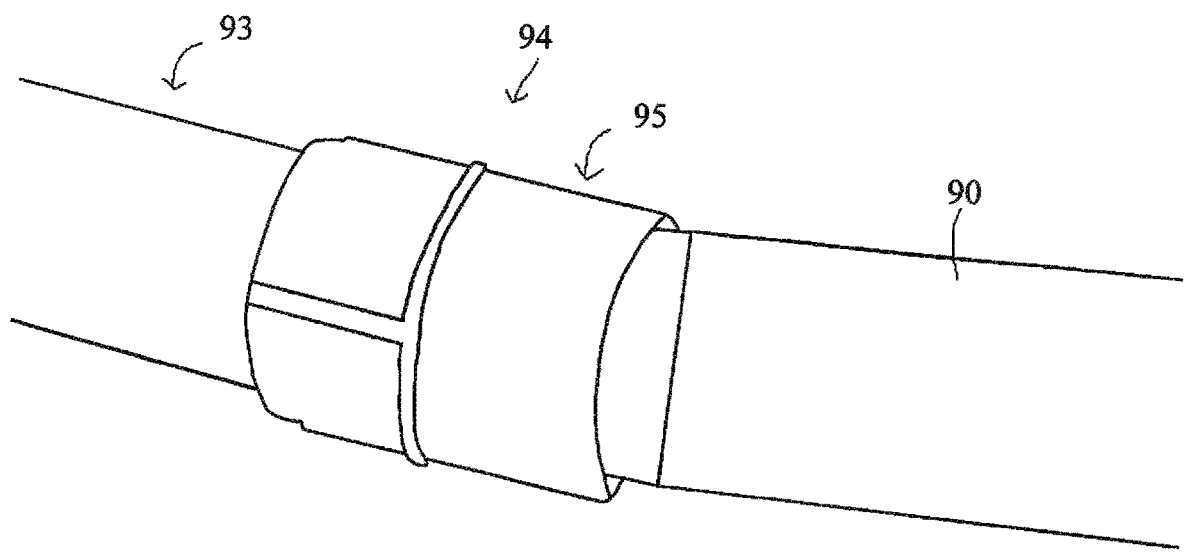
FIG. 20 is a perspective view of a prior art conduit and adapter.
Figure 21:
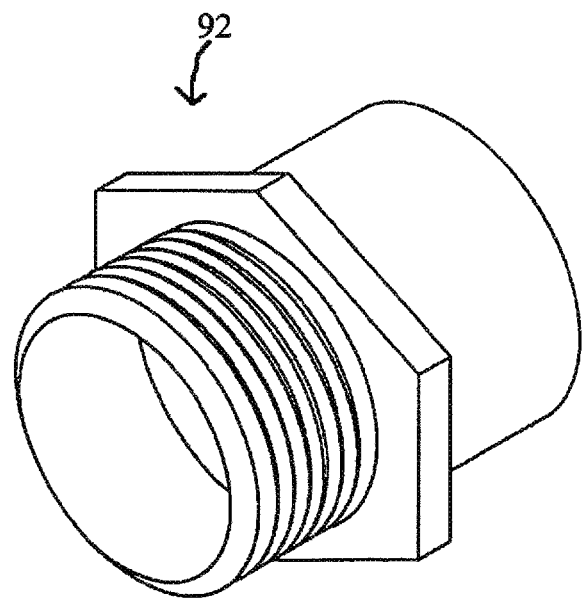
FIG. 21 is a perspective view of a prior art adapter
Figure 22:
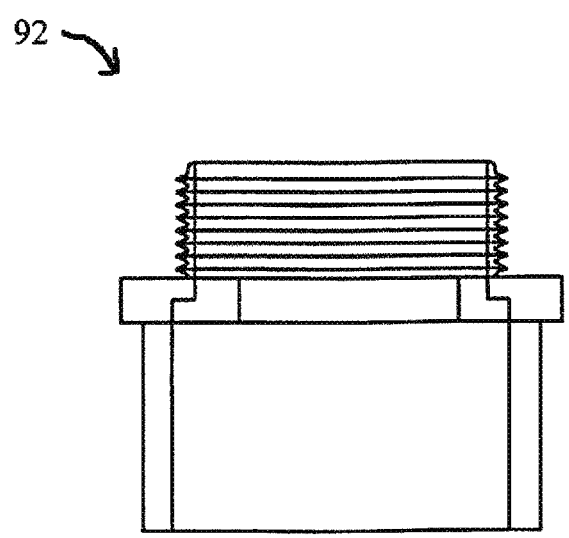
FIG. 22 is a section view of the adapter of FIG. 19.
Figure 23:
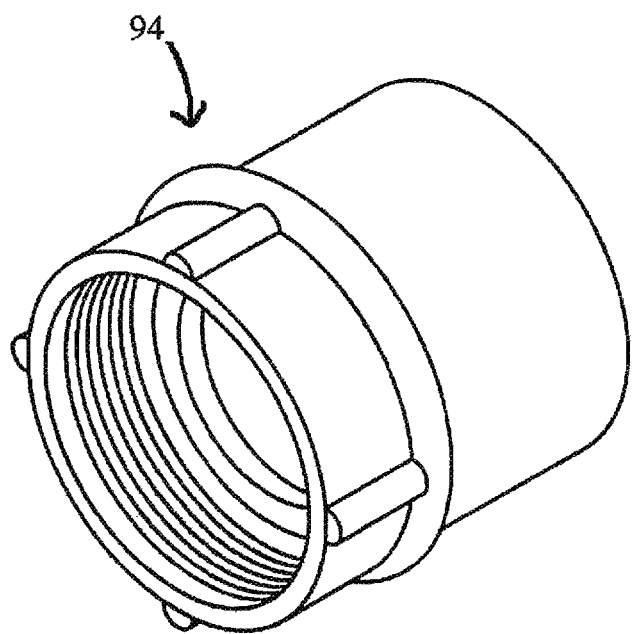
FIG. 23 is a perspective view of a prior art adapter.
Figure 24:
FIG. 24 is a section view of the adapter of FIG. 21.
Figure 24:
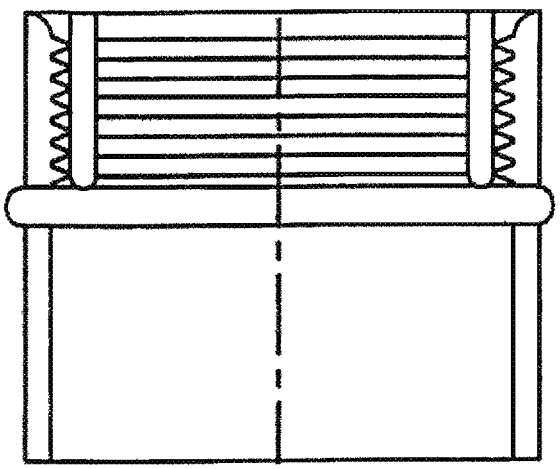
Figure 25:
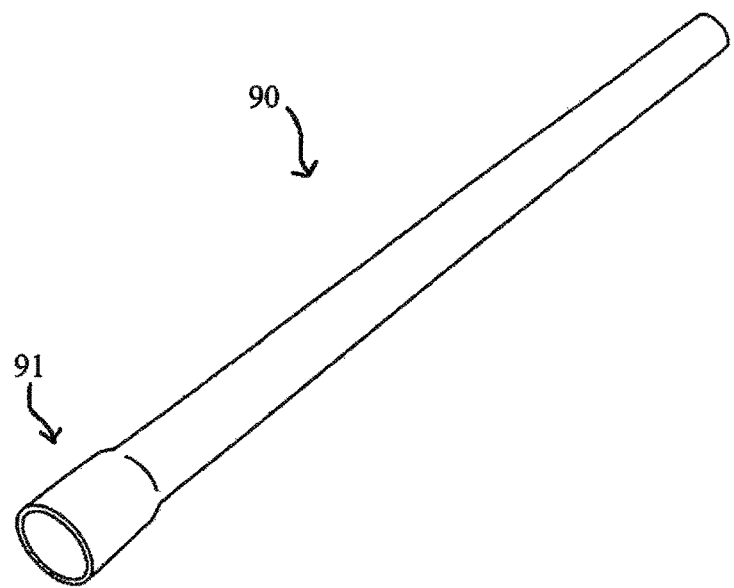
FIG. 25 is a perspective view of a prior art conduit.
Figure 26:
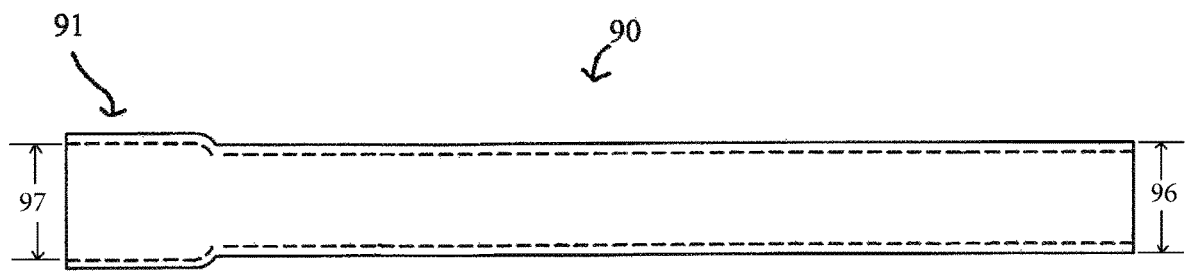
FIG. 26 is a section view of the conduit of FIG. 23.

Threaded end 24 of adapter 20 has threads spanning a total thread length "T". In one aspect female end 26 has a length L with a measure at least two times thread length T. In other aspects the female end length L has a measure of at least 2.5 times the thread length T. In one example a "size 1" adapter 20 has threads 27 spanning a total thread length T of $^{11}/_{16}$ inches (0.6875), with end length L having a measure of about 3 inches, and OD of 1⅝ inches (or 1.625 inches). Having such relatively long length L in comparison to the thread length T and also in comparison to the standard OD provides great strength improvement and improvements in the ease of installation and overall performance of adapter 20 and an installed conduit 90. For instance, and compared to prior adapters, a long or enhanced end 26 with length of at least two inches and Total Length at least as long as the OD is easy to grasp with a full hand and to subsequently twist or thread upon a pipe. The longer end 26 also provides a greater cavity 40 volume to receive an inserted conduit 90 to more securely hold the conduit into position. Such longer end 26 reduces or eliminates bending or separation that may occur with prior art adapters as shown in FIG. 20. Prior art adapter 94 has a short female end 95 from which a conduit 90 is more apt to separate due to weather changes (freeze-thaw) or disruption to conduit 90. As shown in FIG. 20, the conduit 90 is skewed within and partially pulled from the adapter 94. Such condition may arise, for instance, due to the freeze/thaw forces acting upon underground utilities. In some instances, the disruption shown in FIG. 20 occurs underground, and may be observed when water washes away the surrounding soils to reveal a break or weakened connection. The components may become weakened or disconnected upon backfilling of dirt within a trench or other shifting of soils. The same breaking of connection may take place underneath concrete or asphalt or other surface which may not be readily identified and/or which requires extensive efforts to fix. Such broken or weakened conditions may persist for long periods of time because they are not readily identifiable. Such problems or potential problems with the separation or leaking of conduits at adapter joints have been occurring for several years and decades. Heretofore unrecognized is the benefit of adapter 20 with female end 26 having an extended length, such as a length of at least 2 inches and where the Total Length is at least as long as the OD adapter 20. The significance of having such long female end 26 and ratio of Total Length to OD is even more pronounced in light of the benefits realized by avoiding costly repairs for separated conduit-adapter joints. For instance, the cost of running plastic conduit underground in a raceway is a fraction of the cost to run iron rigid pipe, and when a faulty connection exists below a concrete structure expensive re-routing of conduit is required. Because such re-routing is typically positioned above ground, expensive rigid piping is needed, and such routine is typically not a direct route. Rather, the re-routing requires multiple angled joints to extend the conduit around sharp corners and in protected areas, often requiring overhead spans and angles. The cost of metal conduit piping and labor to configure the re-routing is extreme in comparison to the cost savings when using underground plastic conduit that does not separate. Additionally, use of adapter 20 allows for efficient installation compared to prior adapters due to the components avoiding disconnection during layout of the project. Heretofore unrecognized is the advantage of adapter 20 having female end 26 of at least two inches and where the total length TL is at least as long as the outer diameter of adapter 20.

An adapter 20 of the present invention having a female end 26 which is at least 2 inches and having total length at least as long as the outer diameter provides an improved connection with an inserted conduit 90 to reduce or eliminate such problems experienced with prior adapters. Such enhanced length L and diameter ratio allows for a greater surface area to achieve a longer and better bonding connection with the glue/cement, and a greater surface area or volume such that if there is a break in the bond or outward movement of conduit 90 from within cavity 40, there is nonetheless sufficient structure at end 26 to hold or retain the inserted conduit 90 instead of having the conduit bend or separate from adapter 20. Such enhanced length L also accommodates easier installation because conduit 90 is less apt to separate from adapter 20 when the conduit and adapter components are sized or laid out prior to cementing/bonding. For instance, an installer might typically connect the adapters 20 and conduits 90 as a dry run test to determine appropriate length and positioning or repositioning of the components prior to gluing or cementing the components. In doing so, the components may be adjusted lengthwise or sideways or repositioned in a variety of ways, all tending to cause the components to separate. If a separation occurs, such as if a conduit 90 separates from an adapter 92, 94, or does not "bottom-out" within the adapter, the installer must walk to the point of separation and rework the connection. In some instances the installer is not aware of a situation where the conduit only slightly slides outward from "bottomed" engagement within an adapter 92, 94. Reworking one connection may lead to other components becoming separated, thus resulting in a multitude of separated components and ever-increasing effort and time to complete a proper installation.

With adapter 20 having an enhanced length L and diameter ratio as described provides significant savings in terms of time and cost of installation and also in terms of quality of connection. The assembled components are less apt to separate during the dry-run arrangement, thus allowing the installer to arrange and size the components properly to fit the best solution, while doing so quickly because the components have not separated. Further, in some instances a less-than-perfect connection may still be an acceptable connection in compliance with electrical codes and best practices. For instance, if there is some slight outward sliding of a conduit 90 from adapter 20, the enhanced length L and diameter ratio will nonetheless provide sufficient surface area and volume of cavity 40 to achieve an acceptable bonding connection. Given the greater surface area, additional cement may be used, and even where there is some outward sliding there is or may be sufficient structure for the connection. The extra cost in creating a lengthy female end 26 and diameter ratio, and the extra expense or use of cement or glue within the end, and the extra volume of space required for packaging or storage of an adapter 20 having a lengthy female and stated diameter ratio will be offset by the efficiency of installation and improved connection. Adapter 20 having end 26 with enhanced length L and stated diameter ratio allows more room for error while still providing a quality and appropriate connection. Applicant believes this will result in even further savings because less skilled labor can be employed for the installation and/or less attention to the details may be used while still achieving a quality and appropriate connection. An installer has a greater "piece of mind" that a solid connection is achieved by using adapter 20 having such enhanced end 26. An installer will typically thread adapter 20 onto a threaded pipe, then apply a glue or cement within adapter 20, and then insert the terminal end of conduit 90 into female end 26. While an extended female end 26 and stated ratio might make it more difficult to insert conduit 90 into adapter 20, the extended female end 26 and diameter ratio provides a more stable connection as compared to devices without such structure. As noted below, having the stated female end 26 and diameter ratio allows for a more efficient installation in terms of grasping adapter 20 in hand while avoiding scraping of knuckles during installation and with additional mechanical advantage for treading onto components.

In a case where successive conduits 90 are bonded together along a long stretch of terrain or other application, the terminal conduit 90 which is poised to be connected to an adapter at or adjacent an electrical box or connected to an underground threaded pipe might have a length that is a bit short of the pipe to which the conduit is to be connected. In a typical case the installer will splice a piece to the terminal conduit 90 in order to close the gap to connect with the final component. Alternatively, the installer will remove the bell end 91 of conduit 90 by cutting or other process. This leaves conduit 90 without a bell 91 and/or without threads for connecting to a pipe 93 or other threaded component. Having adapter 20, however, allows greater flexibility in obtaining a secure connection due to the enhanced features of end 26.

Figure 6:
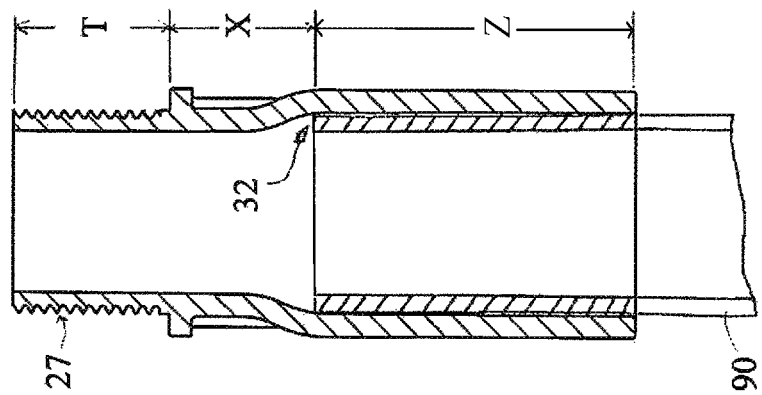
FIG. 6 is a section view depicting insertion of a conduit element within the adapter as shown in FIG. 5.
Figure 5:
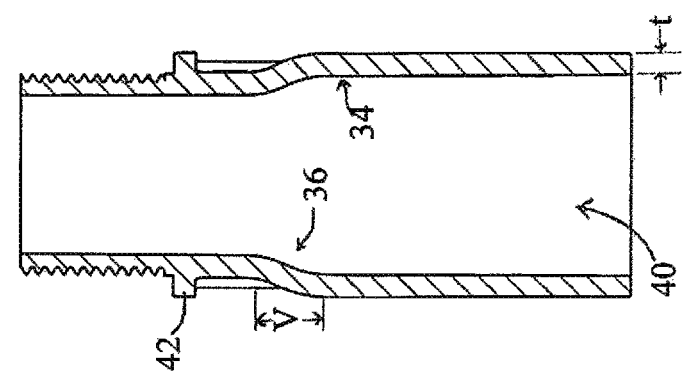
FIG. 5 is a section view taken along line 5-5 of FIG. 3.
Figure 4:
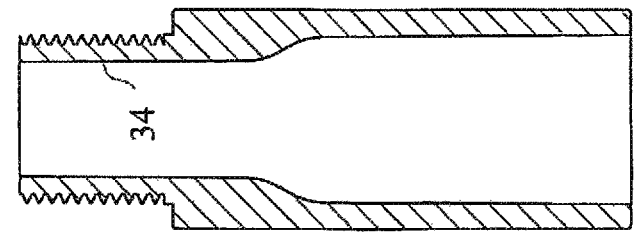
FIG. 4 is a section view taken along line 4-4 of FIG. 3.

Referring to FIGS. 1-7, adapter 20 is shown in various side, front and section views. Female end 26 includes a transition portion "X" (See, for instance, FIG. 6) which spans from threads 27 of threaded end 24 to a stop 32. Stop 32 is a portion within adapter 20 where an inner surface 34 of end 26 prevents insertion or further insertion of conduit 90. Inner surface 34 is the inner wall of conduit 20 as shown in FIG. 5. Stop 32 coincides with a tapered or tapering of inner surface 34 as shown. Particularly, the inner diameter of end 26 at a distal area is greater than the inner diameter of end 26 at transition portion X. Further, transition portion X includes or defines a taper 36. Inner surface 34 is configured to gradually taper at taper 36 to reduce the inner diameter of adapter 20. A gradual or smooth taper has distinct benefits compared to a blunt diameter reduction. For instance, insertion of wire or cabling through a conduit 90 and into and/or through adapter 20 having a smooth taper 36 allows the wire or cable to easily pass without interruption. For instance, when a terminal end of the wire approaches or contacts taper 36 the wire will simply adjust/slide along taper 36 because there are no blunt aspects of surface 34. If a conduit 90 were ever to slide outward from end 26, an inserted wire or cable would nonetheless pass freely along taper 36 and inner surface 34; whereas if an adapter had an exposed blunt portion such as those shown in prior art adapters, a wire or cable end tends to stop or catch at those blunt surfaces, causing additional work and time to run the wire or cable through conduit 90. In some instances an installer would have to back-out a length of wire or cable simply to repeatedly adjust or maneuver the wire past a blunt surface. While such individual action might be accomplished relatively quickly, the repetition causes delay and frustration, especially when compared to insertion of cabling without interruption. In some cases with a prior art adapter 92, 94 when a conduit partially slides outward from an inner blunt surface, such portion will be exposed which increases the possibility of inhibiting a wire or cable from passing through without interruption. The taper 36 of the present invention, however, will nonetheless allow smooth passage of the wire or cable without interruption, even if the conduit 90 were to move away from stop 32. As shown in FIG. 6, in one aspect tapered inner surface 34 corresponds to the inner diameter D of the threaded end (see also FIG. 18).

As shown in FIG. 6 an inserted conduit 90 will approach taper 36 and be stopped from further insertion at stop 32. The outer diameter of conduit 90 is sized such that conduit 90 slides easily into cavity 40 and along inner surface 34. Conduit 90 comes in a standard trade size. In some instances a slight clearance exists between conduit 90 and inner surface 34 of end 26 to accommodate easily sliding of conduit 90 into end 26. Also, there may be slight variations in the respective surfaces and diameters due to differing manufacturing tolerances such that one conduit 90 may "bottom-out" at a particular stop 32 while a different conduit may bottom-out at a slightly different location. In general, however, the stop 32 is typically at a narrow region where taper 36 begins to narrow. In some aspects the stop 32 will coincide with the grip region 48 as noted below, and in other cases the stop 32 need not coincide with the length of grip 50. When a conduit 90 contacts the region at stop 32 the conduit will be prevented from passing all the way through adapter 20. In some cases the conduit will stop at stop 32. It may be appreciated that a force may also be further applied to conduit 90 to wedge conduit 90 further into stop 32 and/or taper 36. Such force may cause conduit 90 to insert a millimeter, for instance, or a few millimeters, as it is wedged further within end 26. The inner diameter of end 26 is uniform from terminal edge 29 to the taper 36. In some aspects the inner diameter of end 26 may slightly taper from terminal edge 29 to the taper 36.

In further reference to FIG. 6, in one aspect the transition portion "X" has a length at least half the thread length "T". Providing transition portion X with such length allows for a generally easy or smooth angle and resulting taper to easily pass wire or cable through adapter. A shorter transition portion X would otherwise tend to provide a more "blunt" surface which could otherwise inhibit insertion of wire or cables. In one aspect as shown in FIG. 5, taper 36 spans a taper length "V". Taper length "V" has a length at least as great as the thickness "t" of the wall of female end 26. In one aspect taper length "V" is twice or at least twice the thickness "t", and in other aspects taper length "V" is three times or at least three times the thickness "t". In an alternative aspect, taper 36 may end at threads 27 or at or adjacent shoulder 42.

In further reference to FIGS. 1-7, adapter includes a grip region 48 having a plurality of gripping elements or grips 50. In one aspect gripping region 48 spans from threaded end 24 a gripping length "G" toward terminal end 29 of female end 26. Grip region 48 includes a plurality of recesses 52 separated by grip walls or ribs 54 and defined by outer recess wall 56. At least a portion of the outer recess wall 56 is positioned radially inward as compared to an outer diameter or the outermost diameter OD of female end 26. Ribs 54 extend from outer recess wall 56 a distance no greater than the outermost diameter OD of female end 26. In one aspect an outermost surface 55 of ribs 54 is planar with outermost surface 57 of female end 26, i.e., ribs 54 align flush with the outer diameter of female end 26 (See FIG. 1). In one aspect adapter 20 includes six symmetrically disposed recesses grips 50 or recesses 52. In one aspect ribs 54 extend from the transition portion "X". In further aspects grip region 48 has a length "G" (See FIG. 2) which corresponds with transition portion "X". In other aspects grip region 48 has a length that is greater than transition portion "X". In other aspects grip region 48 has a length that is less than transition portion "X". In one example, grip region 48 spans a distance "G" at least greater than half thread length "T". In other examples grip region 48 spans a distance "G" at least the distance of thread length "T". Having a grip region 48 of about one inch in length, and with ribs 54 spaced about ½ inch apart (or greater), allows for a comfortable and solid hand grip where an installer's thumb and forefinger are conveniently positioned in the recesses 52. Such elongated grip region 48 together with the elongated female end 26 allows an installer to comfortably hold adapter 20 in his or her hand with the terminal end 29 pressed against the user's palm and while allowing the thumb to lay within one of the recesses 52 to accommodate a solid gripping of adapter 20, especially when threading the adapter 20 into a threaded pipe 93 or other threaded component. Moreover, the elongated grip region 48 and elongated female end 26 allow the installer to grip adapter 20 with a thumb and three or four fingers together with at least a portion of the user's palm. This allows the user to rotate his or her wrist and forearm for turning adapter 20 onto a threaded component compared to only being able to use a thumb and a finger or a few fingers for such turning with prior devices.

Grip region 48 is offset from terminal end of threaded end 24 in part because an installer is less apt to scrape knuckles or fingers when threading the adapter 20, 20' to a box or other component. The offset orientation provides a greater space between the fingers/knuckles and the box. The installer may grasp the grip while keeping his or her thumb and fingers at a position distal the threads and the associated box or other components. This allows for easier turning or threading of the adapter 20, 20' without scraping of knuckles or fingers. Grip region 48 having a length of at least ½ inch and in some instances about 1 inch or at least 1 inch allows for a strong and comfortable grip location and sufficient grip elements to easily rotate or thread the adapter 20, 20'. Having a grip region 48 that is relatively long in relationship to the thread length T and overall total length TL accommodates easier insertion of adapter 20 onto, and screwing upon, a threaded component. A shorter grip portion would tend to make it more difficult for a user to grasp the adapter, and simultaneously align the adapter, for screwing upon a threaded component. Having a relatively long female end 26 in comparison to an adapter having a short end also accommodates an easier alignment for threading the adapter 20, 20' on a threaded component. Female end 26 having length of at least 2 inches and total length being at least as long as the outer diameter provides mechanical advantage for threading adapter 20 onto a threaded component.

Having ribs 54 aligned flush with surface 57 of end 26 (i.e., not projecting outward from the OD) allows for adapters 20 and associated conduit 90 to be placed next to each other in close or tight alignment. Because there are no projections, the conduits 30 may be tightly packed together to save space in a trench, raceway or other location, and by tightly aligning adjacent runs of conduit will tend to cause the bundling of conduit lines to work as more of a connected bundle as opposed to loose strands. Such bundling provides a stronger resistance to freeze/thaw forces. The smooth profile adapters 20 also allow for easier or more efficient packaging, storage or transport because they can be placed together in tight contact irrespective of the orientation of the adapters. Adapter 20 may also be used to join PVC components or conduit 90 to other PVC or conduit 90. In one aspect adapter 20 is made of PVC or other hard plastic.

Figure 13:
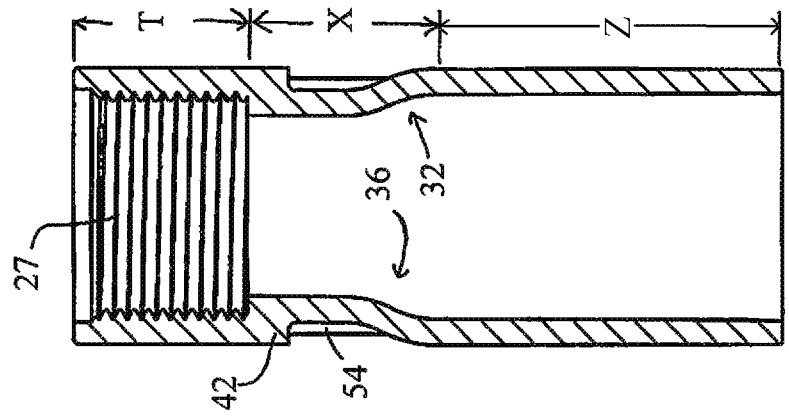
FIG. 13 is a section view taken along line 13-13 of FIG. 11.
Figure 12:
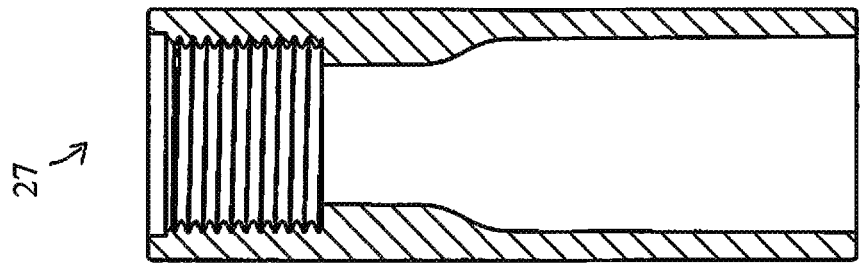
FIG. 12 is a section view taken along line 12-12 of FIG. 11.
Figure 11:
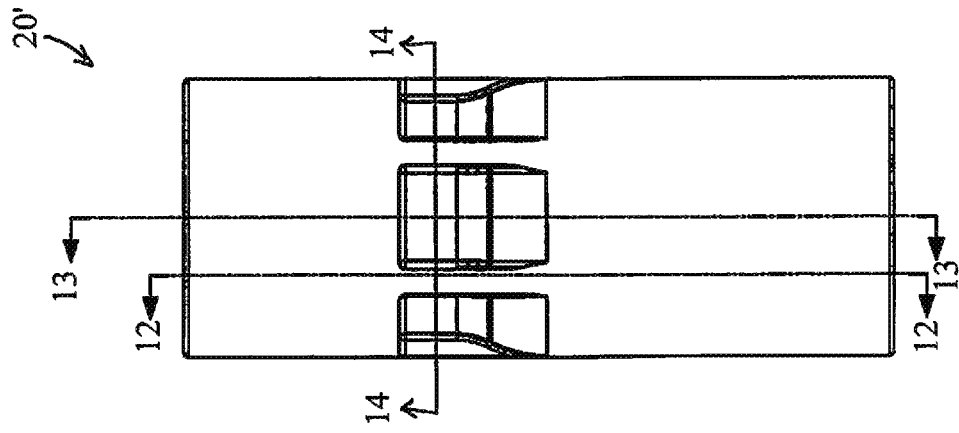
FIG. 11 is a front view of the adapter of FIG. 9.
Figure 14:
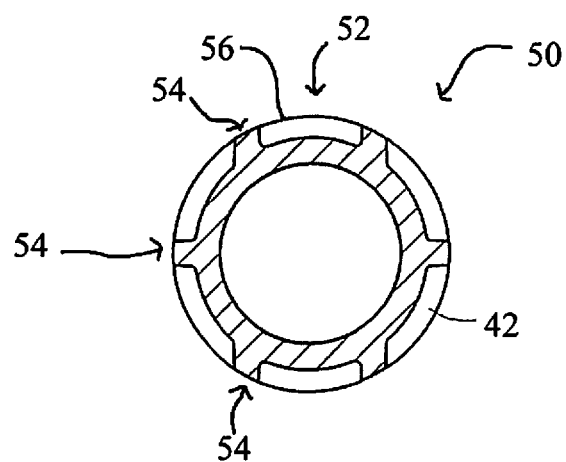
FIG. 14 is a section view taken along line 14-14 of FIG. 11.
Figure 15:
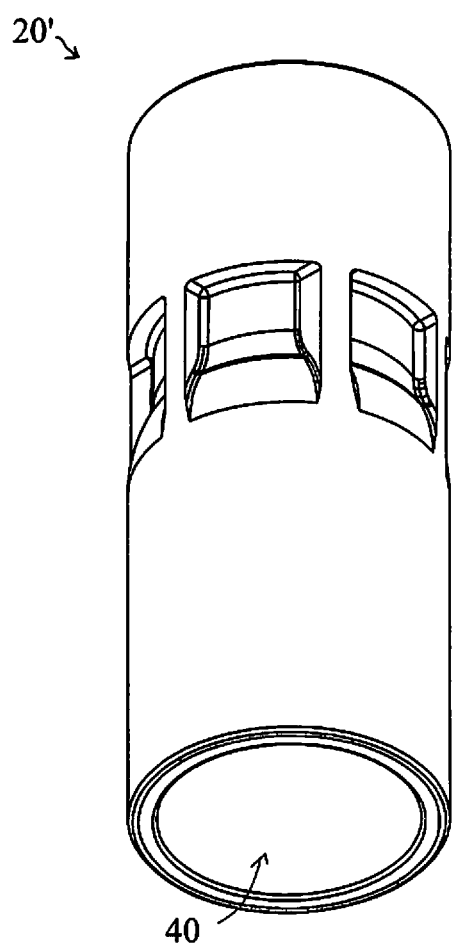
FIG. 15 is a bottom perspective view of the adapter of FIG. 9.

In a further aspect of the invention, an alternative conduit 20' is shown with reference to FIGS. 9-17. Adapter 20' is a perspective view depicting a female threaded adapter where the threads at threaded end 24 are positioned at inner surface of adapter 20'. Threads 27 span a thread length T within the tube of threaded end 24. In one aspect the features of adapter 20' are the same or nearly the same as those shown with adapter 20. A stop 32 is present within end 26 defined at least in part by taper 36. As shown in FIG. 13, the wall of conduit 20' has a generally uniform thickness along the section line 13-13 of FIG. 11. Providing such a uniform or relatively uniform thickness assist in rapid manufacture of adapter 20' in light of the improved (lessened) release times for removal of adapter 20' from a production mold. Adapter 20' is typically made of rigid plastic such as a PVC material. As with the adapter 20 described above, threaded end 24 may be threaded upon a pipe or other component by turning adapter 20'. Adapter 20' also receives a conduit 90 at receiving female end 26. Grip region 48 accommodates a desired grip and turning of adapter 20'. In one non-limiting example, a "size 1" adapter 20' will comprise a tube having a thread end 24 with threads of a thread length "T" of about ⅞ inches, an outer diameter OD of 1⅝ inches, and a total length of almost 4 inches. In one aspect the transition portion "X" will have a length of about ¾ inches. Other lengths and measures are also available and especially for establishing an adapter 20' which meets standards for such conduits and connections.

As with the adapter 20 shown above, the present adapter 20' includes grip region 48 and taper 36. The extended female end 26 also allows for convenient gripping of adapter 20 and receives a conduit 90 for enhanced stability. The taper 36 provides for smooth running of cable through adapter 20' as described with respect to adapter 20.

Figure 16:
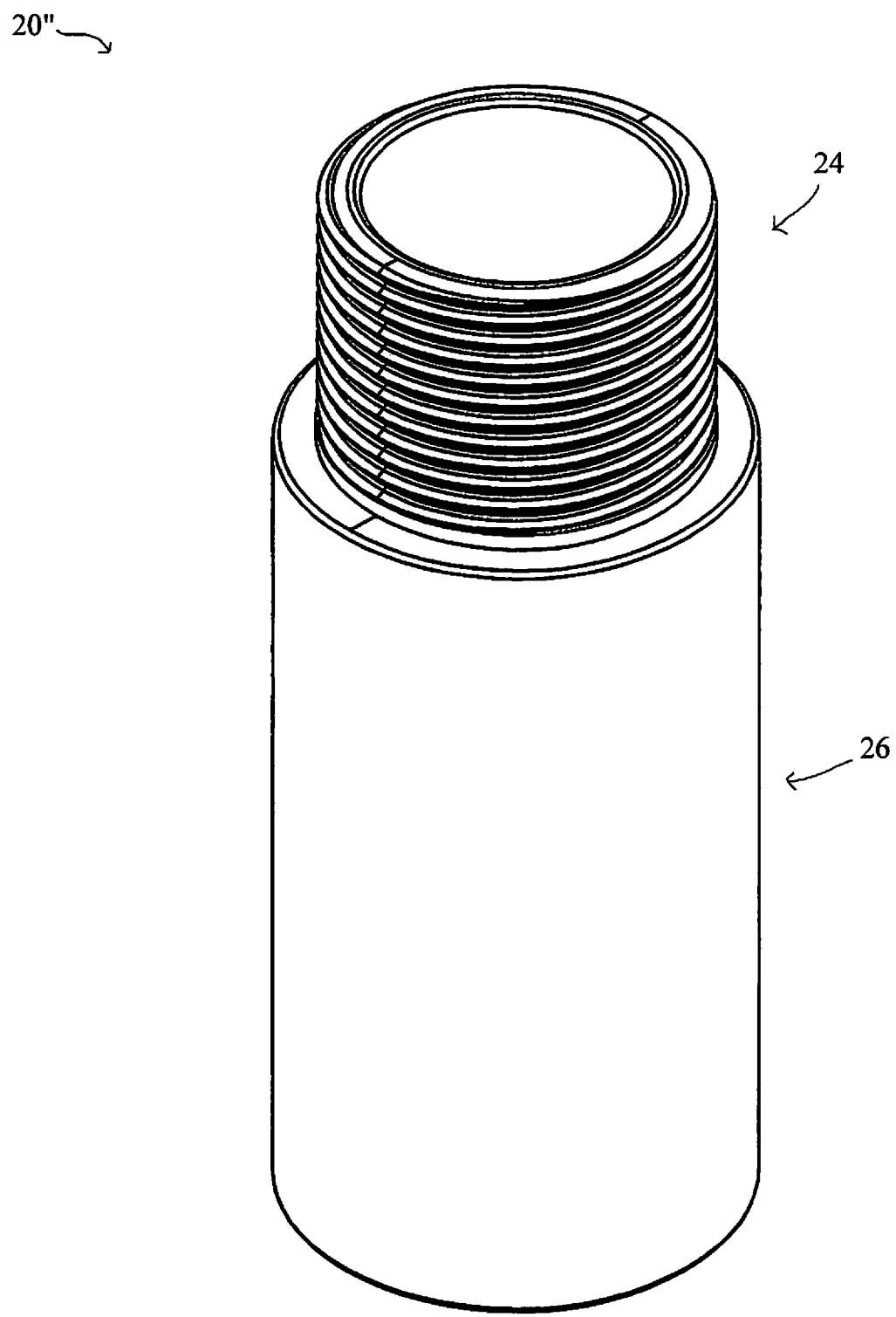
FIG. 16 is a perspective view of an adapter in accordance with a further aspect of the invention.
Figure 17:
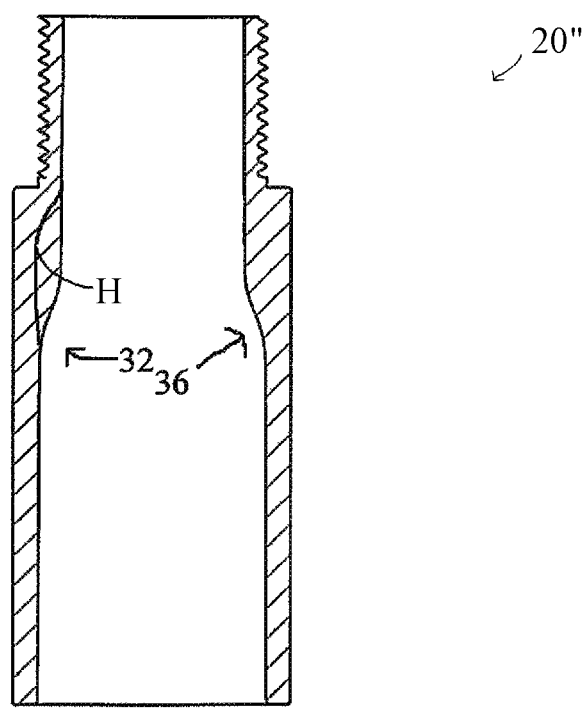
FIG. 17 is a section view taken along line 17-17 of FIG. 16.

In a further aspect with respect to FIGS. 16 and 17, adapter 20" depicts a male thread adapter without a grip region 48. In one aspect, adapter 20" is identical to adapter 20 in all other respects. Adapter 20" includes a stop 32 and taper 36 as described herein. An alternative profile configuration of the taper and positioning of taper 36 is shown with reference to alternative profile line "H" as shown in FIG. 17. For instance, an alternative aspect will have inner surface 34 extend such that taper 36 is defined at alternative profile line H. Such alternative, however, will have a relatively weakened structural area adjacent threads 27 compared to the primary structural profile where the taper 36 is positioned distally from threads 27 as shown in FIG. 17.

Figure 19:
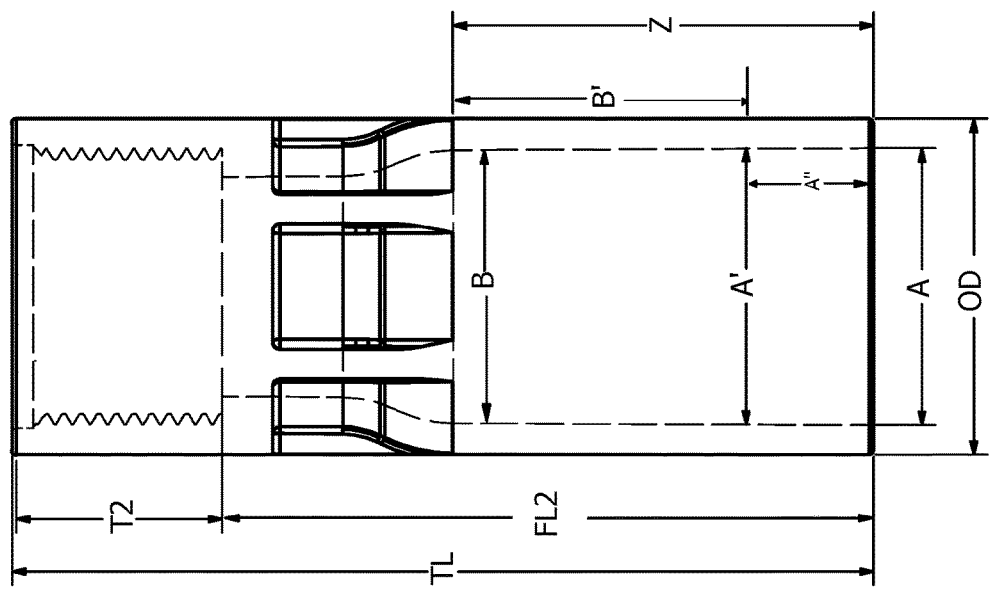
FIG. 19 is a side view of the adapter of FIG. 9 with markings shown for clarity.
Figure 18:
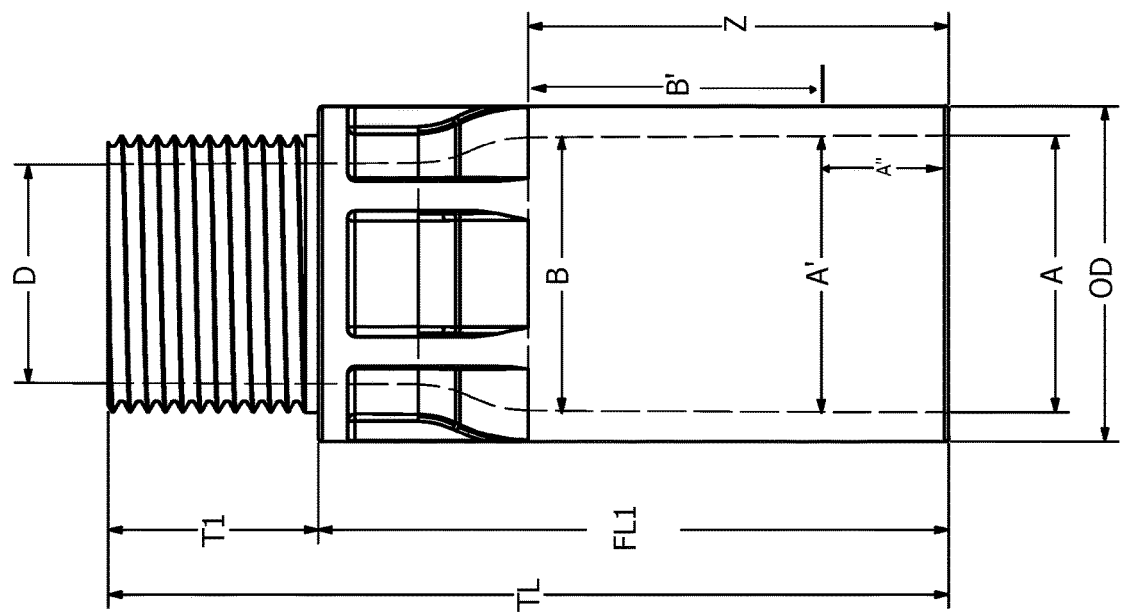
FIG. 18 is a side view of the adapter of FIG. 1 with markings shown for clarity.

Table 1 corresponds with FIG. 18 and FIG. 19 and presents dimensional data consistent with further aspects of the invention pertaining to adapter 20 with threaded end 24 comprising male threads having a typical thread length "T1", typical OD, typical female end length FL1, bell depth "Z" and overall adapter length TL (Total Length); and pertaining to adapter 20' with threaded end 24 comprising female threads having a typical thread length "T2", typical female length FL2, typical OD, typical bell depth "Z" and overall adapter length TL. Inner diameter A reduces to inner diameter B as may be appreciated. The data shown below for diameter B correspond to a diameter B positioned at or just prior to stop 32. Such slight narrowing or tapering within the bell of female end 26 further accommodates securing of conduit 90. Inner diameter D is also shown in FIG. 18.

| Trade Size | A | B | D | OD | Z | FL1 | FL2 | T1 | T2 | TL |
|---|---|---|---|---|---|---|---|---|---|---|
| ½ | .852 | .836 | .597 | 1⅛ | 1⅜ | 2⅜ | 2⁹⁄₁₆ | ⁹⁄₁₆ | ¾ | 3⅛ |
| ¾ | 1.064 | 1.046 | .800 | 1¹¹⁄₃₂ | 1½ | 2½ | 2¹¹⁄₁₆ | ⁹⁄₁₆ | ¾ | 3¼ |

-continued

| Trade Size | A | B | D | OD | Z | FL1 | FL2 | T1 | T2 | TL |
|---|---|---|---|---|---|---|---|---|---|---|
| 1 | 1.330 | 1.310 | 1.018 | 1⅝ | 1¾ | 2¾ | 2¹⁵⁄₁₆ | ¹¹⁄₁₆ | ⅞ | 3⅝ |
| 1¼ | 1.677 | 1.655 | 1.332 | 2¹⁄₃₂ | 1⅞ | 2⅞ | 3 | ¾ | ⅞ | 3¾ |
| 1½ | 1.918 | 1.894 | 1.566 | 2⁵⁄₃₂ | 2¾ | 3¼ | 3⅞ | ¾ | ⅞ | 4⅝ |
| 2 | 2.393 | 2.369 | 2.000 | 2²¹⁄₃₂ | 3¼ | 4¼ | 4⅜ | ⅞ | 1 | 5¼ |
| 2½ | 2.890 | 2.868 | 2.376 | 3⁵⁄₁₆ | 3¼ | 4¼ | 4½ | ⅞ | 1⅛ | 5⅜ |
| 3 | 3.515 | 3.492 | 2.954 | 4 | 3⅞ | 4⅞ | 5⅛ | ⅞ | 1⅛ | 6 |
| 3½ | 4.015 | 3.992 | 3.440 | 4½ | 3⅞ | 4⅞ | 5⅛ | ⅞ | 1⅛ | 6 |
| 4 | 4.515 | 4.491 | 3.940 | 5³⁄₃₂ | 4 | 5 | 5¼ | ⅞ | 1⅛ | 6⅛ |

As shown in Table 1 and with reference to the figures, the female end 26 corresponding with FL1 and FL2 has a length of at least 70% of the total length TL. In some instances the FL1 and/or FL2 is closer to or greater than 80% of the total length TL. Such relatively long FL1 and FL2 also provides for the advantages noted herein. In some instances the female length is at least three inches measured from the terminal edge of the female end to the threaded male end. In further aspects the bell depth Z is at least 1⅜ inches and even much greater in other instances. In further aspects, the female end FL1, FL2 has a length at last as long as the outer diameter OD. In some instances, the length of grip 50 measures one inch (FL1−Z=1 inch). Such one inch length for grip 50 accommodates an efficient grip while also maintaining structural integrity of adapter 20 and coincides with taper 36 while also maintaining near uniformity of thickness of the adapter. In one aspect grip 50 is positioned at female end 26 even in the case where threaded end 24 includes internal threads. Again, this allows for grip control of adapter 20 to thread adapter 20' onto a threaded component while maintaining separation of a user's fingers from the threaded or other components.

With further reference to FIGS. 18 and 19, further aspects of the invention show female end 26 having inner diameter A' which is offset a distance A" from terminal edge 29. In one instance, the measure of diameter A' may be equal to the measure of diameter A, i.e., the diameter may remain constant. The measure of the constant distance, for instance, may vary depending on the desired application. In one instance the measure A" is offset at least 25% of the bell length depth Z from terminal edge 29. The remaining portion of depth Z may include a slight or "minor" taper (i.e., the minor taper equals the difference between the measure of inner diameter A (or A') and the measure of inner diameter B). The minor taper allows for friction fit insertion of a conduit 90 into female end 26. This is especially the case where conduit 90 is a standard trade size conduit and/or a conduit 90 having an outer diameter of standard trade size variety. In one non-limiting example where adapter 20 is of a standard trade size measure of "1", the inner diameter A will measure 1.330 inches and the inner diameter B will measure 1.310 inches; a corresponding conduit 90 (to be received in adapter 20) having a standard trade size measure of "1" will have an outer diameter measuring 1.315 inches. The 1.315 inches is small enough to insert conduit 90 into female end 26 yet great enough to encounter resistance when slid within female end 26 (i.e., female end narrows or has a minor taper where at some point conduit 90 is no longer able to further inserted within female end 26 or encounters major taper 36 or stop 32. In some instances further insertion of conduit 90 will be prevented prior to stop 32 due to the minor taper. It may be appreciated that similar characteristics of the foregoing are present for the different standard trade sizes of conduit 90 and adapter 20.

In operation, and typically before a user inserts a standard trade size conduit 90 into a female end 26 of a corresponding trade size adapter 20, the user will apply a glue or cement to female end 26. This typically is applied by use of a sponge or other applicator where the user slides the applicator into female end 26 to coat the inner walls or surface 34, leaving a layer of glue or cement. Conduit 90 is thereafter inserted into female end 26. Even prior to this step the adapter 20 is or may have already been connected to a corresponding trade size pipe or other component, typically by threading adapter 20 onto a threaded pipe or other component. Insertion of conduit 90 into female end 26 is typically accomplished by the user holding conduit 90 in one hand while holding the pipe or adapter 20 in another hand and joining the parts together. The cement or glue initially operates as a lubricant to allow conduit 90 to easily slide within female end 26 and to overcome the friction or resistive forces encountered due to the minor taper. In many instances the glue or cement may provide sufficient lubrication to allow conduit 90 to "bottom out" against a stop or major taper within the adapter. While the conduit 90 is inserted, the cement spreads throughout female end 26 (or at least throughout a portion of end 26) to coat and seal conduit 90 within adapter 20. Due to the minor taper and tolerances between the female end and conduit, the cement, once hardened or bonded, creates and airtight and watertight seal. Having an enlarged female end 26 provides enhanced surface area for dispersion of the cement to cover a greater area and achieve a more robust airtight connection as opposed to a situation where the size of female end 26 is not as enhanced. In further aspects where inner diameter of female end 26 includes a longitudinal portion that remains constant, such portion operates to retain the compressed glue or cement within female end 26. Such portion reduces the likelihood that some cement will leak, drip or ooze out of female end 26. Such feature reduces mess and make more efficient utilization of the inserted glue and to provide a more robust connection and seal.

When conduit 90 inserts into female end 26 having a minor taper as described, a friction fit is achieved, i.e., conduit 90 is secured into position within female end 26 so as to inhibit, resist or at least substantially resist sliding and rotation within female end 26. A person having connected the components by hand under normal conditions (with or without cement) would have difficulty in separating the components or twisting the conduit 90 within adapter 20. Such friction fit rigidly secures the conduit 90 within adapter 20, and especially rigidly secures the components when cement or glue is applied. Typically the pvc cement will operate as a lubricant and then harden or bond within seconds, making the conduit rigidly secured within adapter 20. In some aspects and even given a "minor taper" as described, even when conduit 90 meets resistance upon insertion into female end 26, conduit 90 can or may nonetheless be forced further within female end 26. While the components are made of hardened plastic and/or PVC, in some instances there is an amount of flex or tolerance to allow for at least some further insertion (whether or not the conduit "bottoms out"). Use of liquid cement acting temporarily as a lubricant may assist in the further insertion until a stop is achieved.

In a further aspect the invention includes a system or combination of adapter 20 and conduit 90 as described. The combination includes conduit 90 rigidly connected within female end of adapter 20, including by friction fit and or by use of an adhesive (or both). In a further aspect the invention includes a method of creating an airtight joint by utilizing an adapter 20 as described herein and further rigidly securing a conduit 90 within a female end 26 of the adapter 20. Further aspects include passing a wire or cable through adapter 20 and/or through a resulting adapter-conduit joint, which is efficient in light of the major taper which allows cabling to easily pass through the adapter. In further aspect the elongated female end 26 in conjunction with grip 50 allow a method of utilizing adapter 20 for threading upon a component while grasping the adapter 20 at least in part with a palm and/or full hand for efficient handling, alignment and rotation of adapter 20.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An adapter for receiving an extruded rigid PVC electrical conduit at one end of the adapter and for connecting to conduit boxes, threaded pipes, threaded fittings or other components at an opposite threaded end of the adapter, the adapter comprising:
  a rigid PVC tube having a threaded end an integrally connected opposite conduit-receiving female end, the threaded end having threads spanning from a terminal end of the threaded end to a thread beginning, the female end having a length of at least 2 inches measured from a terminal edge of the female end to the thread beginning with a terminal portion of the female end having an outer diameter and the adapter having a total length at least as long as the outer diameter, the female end having a smooth inner surface defining a minor taper comprising a tapered cavity which narrows internally and into which the rigid PVC electrical conduit inserts and friction fits against the smooth inner surface, the rigid PVC tube further having a stop configured to stop further insertion of the rigid PVC electrical conduit where the stop inhibits insertion of a same diameter conduit, the stop having a major taper comprising a tapered inner surface of the female end internal the minor taper, the tapered inner surface of the major taper having an innermost diameter corresponding to an innermost diameter of the threaded end.

2. An adapter for receiving an extruded rigid PVC electrical conduit at one end of the adapter and for connecting to conduit boxes, threaded pipes, threaded fittings or other components at an opposite end of the adapter, the adapter comprising:
  a rigid PVC tube having a threaded end and an opposite conduit-receiving female end, the female end having a length of at least 2 inches measured from a terminal edge of the female end to the threaded end with a terminal portion of the female end having an outer diameter and the adapter having a total length at least as long as the outer diameter, the female end having a smooth inner surface defining a minor taper comprising a tapered cavity which narrows internally and into which the rigid PVC electrical conduit inserts and friction fits against the smooth inner surface, the rigid PVC tube further having a stop configured to stop further insertion of the rigid PVC electrical conduit where the stop inhibits insertion of a conduit having a standard trade size outer diameter, the stop having a major taper comprising a tapered inner surface of the female end internal the minor taper, the tapered inner surface of the major taper having an innermost diameter less than an inner-most diameter of the threaded end.

3. An adapter for receiving an extruded rigid PVC electrical conduit at one end of the adapter and for connecting to conduit boxes, threaded pipes, threaded fittings or other components at an opposite threaded end of the adapter, the adapter comprising:
  a rigid PVC tube having a threaded end an integrally connected opposite conduit-receiving female end, the threaded end having threads spanning from a terminal end of the threaded end to a thread beginning, the female end having a length of at least 2 inches measured from a terminal edge of the female end to the thread beginning with a terminal portion of the female end having an outer diameter and the adapter having a total length at least as long as the outer diameter, the female end having a smooth inner surface defining a minor taper comprising a tapered cavity which narrows internally and into which the rigid PVC electrical conduit inserts and friction fits against the smooth inner surface, the rigid PVC tube further having a stop configured to stop further insertion of the rigid PVC electrical conduit * where the female end includes an external grip comprising a plurality of recesses, at least one of the recesses includes an outer recess wall, at least a portion of the outer recess wall positioned radially inward as compared to an outermost diameter of the female end.

4. An adapter for receiving an extruded rigid PVC electrical conduit at one end of the adapter and for connecting to conduit boxes, threaded pipes, threaded fittings or other components at an opposite threaded end of the adapter, the adapter comprising:
  a rigid PVC tube having a threaded end an integrally connected opposite conduit-receiving female end, the threaded end having threads spanning from a terminal end of the threaded end to a thread beginning, the female end having a length of at least 2 inches measured from a terminal edge of the female end to the thread beginning with a terminal portion of the female end having an outer diameter and the adapter having a total length at least as long as the outer diameter, the female end having a smooth inner surface defining a minor taper comprising a tapered cavity which narrows internally and into which the rigid PVC electrical conduit inserts and friction fits against the smooth inner surface, the rigid PVC tube further having a stop configured to stop further insertion of the rigid PVC electrical conduit, and further comprising an external grip region comprising longitudinally oriented ribs extending from a shoulder of the female end toward a terminal edge of the female end.

5. The adapter of claim 4 where an outermost surface of at least one of the ribs is planar with an outermost surface of the female end.

* * * * *